(No Model.)
M. W. COX.
VELOCIPEDE.
No. 466,989. Patented Jan. 12, 1892.
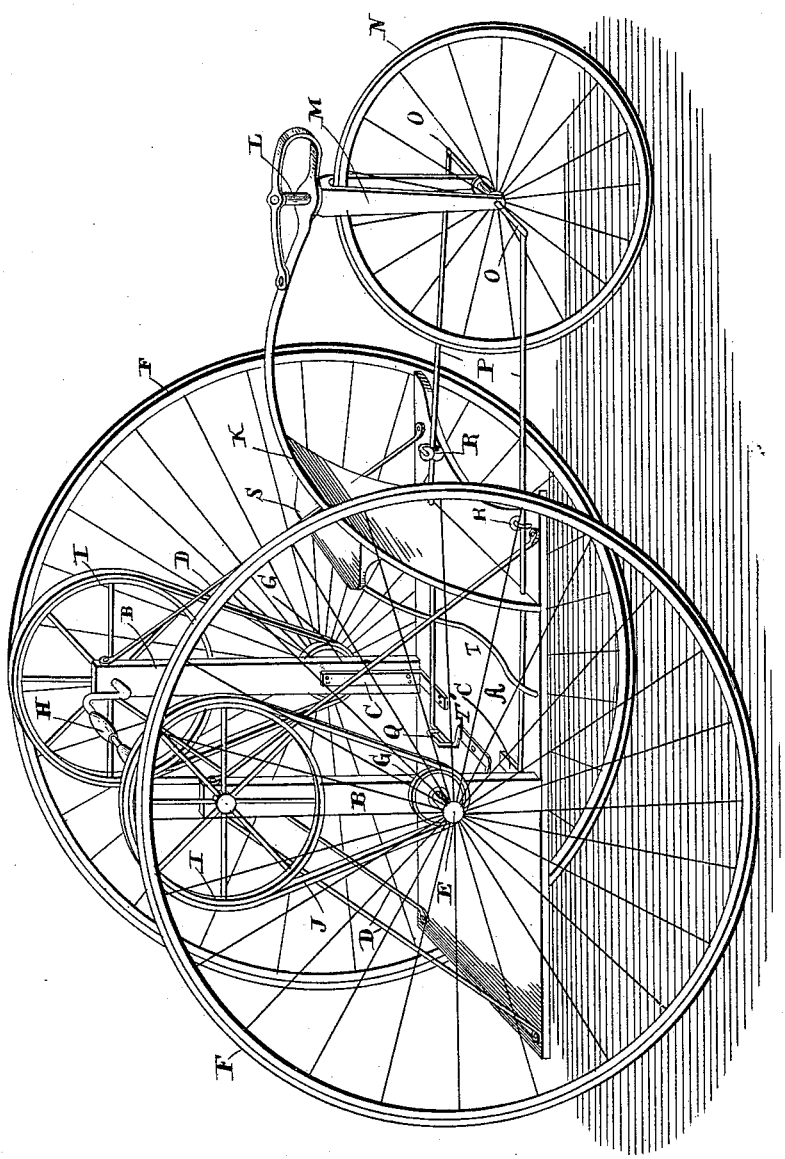
WITNESSES—
Geo. E. Frech.
Roland H. Fitzgerald.
INVENTOR—
Marion W. Cox.
per Lehmann & Pattison
att'ys

UNITED STATES PATENT OFFICE.

MARION W. COX, OF MUDDY VALLEY, ASSIGNOR OF ONE-HALF TO P. T. SOMMERS, OF DUQUOIN, ILLINOIS.

VELOCIPEDE.

SPECIFICATION forming part of Letters Patent No. 466,989, dated January 12, 1892.

Application filed June 8, 1891. Serial No. 395,533. (No model.)

*To all whom it may concern:*

Be it known that I, MARION W. COX, of Muddy Valley, in the county of Jackson and State of Illinois, have invented certain new and useful Improvements in Velocipedes; and I do hereby declare the following to be a full, clear, and exact description of the invention, such as will enable others skilled in the art to which it pertains to make and use it, reference being had to the accompanying drawings, which form part of this specification.

My invention relates to an improvement in velocipedes; and it consists in the novel construction and arrangement of parts which will be fully described hereinafter, and particularly referred to in the claims.

The object of my invention is to provide a velocipede or road-vehicle which is operated by a hand-crank, and which is simple, light, and cheap, and at the same time can be run at a rapid speed.

The accompanying drawing is a perspective view of a machine which embodies my invention complete.

A represents a platform, which is of any suitable length and width, and which is preferably formed of wood for the sake of lightness, though, if desired, sheet metal may be substituted therefor. Rising from opposite sides of this platform, at about the center thereof, are the two vertical standards B, to the inner side of which and to the platform A are secured the L-shaped plates G, and these standards are further braced and held in position by means of the braces D, which are secured to the edges of the standards and to the platform, as shown. Passing through the upper ends of these L-shaped plates C and the standards are the bolts or axles E, upon which the supporting-wheels F are journaled. These wheels F are formed of metal tires and wire spokes and metal hub preferably, though I do not desire to limit myself to the material, and secured to the hubs of these supporting and driving wheels F are the band or sprocket wheels G.

Journaled transversely in the upper ends of the standards B is a cranked driving-shaft H, which extends through the said standards any suitable distance and has permanently secured to the projecting ends the band or sprocket wheels I. Passing around these wheels I G are the bands, cords, or chains J, which, as the cranked shaft H is revolved by hand, revolve the driving and supporting wheels, as will be readily understood.

Extending upward from the rear end of the platform A and curved rearward is an arch K, which has its upper end doubled forward, as shown, and provided with vertical perforations through which the projecting bearing L of the fork M passes, and is journaled therein. Journaled in the lower ends of this form is a steering-wheel N, the spindle O of which extends outward therefrom a considerable distance, and to the ends of which the outer ends of the operating-cords P are secured. The inner ends of these cords are connected with the foot-pedals Q after passing outside of the guiding-pulleys R, which are journaled at the sides of the rear end of the platform. The pedals are mounted on opposite ends of a horizontal rocking bar T', centrally pivoted to platform A. By means of this construction the operator guides the machine with his feet, while the supporting and driving wheels C are driven by the cranked shaft H, as before mentioned.

Extending forward from the arch K is a seat S for the operator, and the forward end of this seat is supported by means of the brace or braces T, which extend upward from the platform, as shown.

By means of the above construction a very cheap, durable, and simple hand road-vehicle is produced.

Having thus described my invention, I claim—

1. In a velocipede, the combination of a platform, vertical standards extending up from opposite sides thereof, braces therefor, the axle-stubs secured to the lower portion of the standards, the wheels mounted thereon, the hand-crank shaft mounted in the upper portions of said standards and having its ends connected by gearing with said wheels, the arch extending up from the rear end of said platform, the guiding-wheel at the outer end of said arch, the seat supported by said arch, and foot steering-gear connected to said guiding-wheel, as set forth.

2. In a velocipede, the combination of the platform, the vertical standards from opposite edges thereof, the axle-stubs from the lower portions of the standards, the supporting-wheels on said stubs, the drive-shaft in said standards geared to said wheels, the rear upward arch K from said platform, the fork pivoted at the outer end of the arch and provided with the guiding-wheel, the spindle O of said wheel being extended on opposite sides thereof, the horizontal swinging bar pivoted on the platform and carrying foot-pieces, the cords from opposite ends thereof to opposite ends of said spindle, guides R R therefor, and the seat S, carried by the arch, as set forth.

In testimony whereof I affix my signature in presence of two witnesses.

MARION W. COX.

Witnesses:
J. D. HAYS,
J. E. HARRIS.